United States Patent [19]
Niki

[11] Patent Number: 5,422,981
[45] Date of Patent: Jun. 6, 1995

[54] PATTERN RECOGNITION METHOD AND APPARATUS USING A NEURAL NETWORK

[75] Inventor: Toru Niki, Yokohama, Japan

[73] Assignee: Canon Kabushiki Kaisha, Tokyo, Japan

[21] Appl. No.: 793,545

[22] Filed: Nov. 18, 1991

[30] Foreign Application Priority Data

Nov. 20, 1990 [JP] Japan .................................. 2-316258

[51] Int. Cl.[6] .............................................. G06K 9/66
[52] U.S. Cl. ............................... 395/22; 395/23; 382/159
[58] Field of Search ................. 395/22, 21, 23; 382/14

[56] References Cited

U.S. PATENT DOCUMENTS

| | | | |
|---|---|---|---|
| 4,941,122 | 7/1990 | Weideman | 364/807 |
| 5,058,179 | 10/1991 | Denker et al. | 382/14 |
| 5,060,278 | 10/1991 | Fukumizu | 382/14 |
| 5,091,780 | 2/1992 | Pomerleau | 358/108 |
| 5,119,438 | 6/1992 | Ueda et al. | 382/14 |
| 5,142,612 | 8/1992 | Skeirik | 395/11 |

OTHER PUBLICATIONS

McClelland et al., Explorations in Parallel Distributed Processing, MIT Press, 1988, pp. 2, 3, 121–152, 245–262, 303, 304.

Lippmann, R. P. "An Introduction to Computing with Neural Networks," IEEE ASSP Magazine, Apr. 1987, 4–22.

Egbert et al., "Preprocessing of Biomedical Images for Neurocomputer Analysis," IEEE Intl. Conf. on Neural Networks, Jul. 1988, I–561–I–568.

Hanson et al., "Comparing Biases for Minimal Network Construction with Back–Propagation," from Advances in neural information processing systems I, 1989, 177–185.

"Information Storage In Neural Networks with Low Levels Of Activity", D. J. Amitt, et al., Physical Review, A. General Physics, vol. 35, No. 5, Mar. 1, 1987, pp. 2293–2303.

"Adaptive Systems In Pattern Recognition", H. Kazmierczaki, et al., IEEE Transactions On Electronic Computers, vol. EC-12, No. 6, Dec. 1963, pp. 822–835.

"Parallel Distributed Processing", by David E. Rumelhart, et al., vol. 1, Chapters 8, 12 & 13, The MIT Press, 1986.

Primary Examiner—Robert W. Downs
Attorney, Agent, or Firm—Fitzpatrick, Cella, Harper & Scinto

[57] ABSTRACT

A method and apparatus for using a neural network to categorize patterns from pattern feature data derived from the patterns. The average of all the learning data of the neural network is subtracted from the pattern feature data, and the result is input to the input layer of the neural network. The neural network outputs a value for each category and the pattern is categorized based on these values. The neural network includes an intermediate layer whose bias is set to zero and which includes a sigmoid transfer function which is symmetric with respect to the origin.

9 Claims, 2 Drawing Sheets

PATTERN RECOGNITION METHOD AND APPARATUS USING A NEURAL NETWORK

BACKGROUND OF THE INVENTION

1. Field of the Invention

The present invention relates to a pattern recognition method for categorizing input data, such as speech input data or image input data.

2. Description of the Related Art

The back propagation type neural network (hereinafter referred to simply as a neural network), as proposed by Rumelhart, et al., has been considered in connection with pattern recognition apparatus which categorize input data into one of plural categories. The construction of a neural network for determining the category will now be explained with reference to FIG. 3.

In FIG. 3, reference numeral 301 denotes elements $U^I{}_1$, $U^I{}_2$ ... etc. of an input layer. The elements of this layer send a received input value to all the elements of the next layer 302 Reference numeral 302 denotes elements $U^S{}_1$, $U^S{}_2$ ... etc. of an intermediate layer. These elements send an output of $$y = f\left(\sum_i W_i x_i - \theta\right)$$

with respect to an input $x_i$ ($i=1, 2, \ldots$) from the elements of the preceding layer 301 to all the elements of the output layer 303, where $W_i$ is called a weight coefficient, and $\theta$ is a bias, both of which are element inherent values. f is called a transfer function, and usually is a sigmoid function $f(s) = 1/(1+\exp(-s))$. Reference numeral 303 denotes elements $U^O{}_1$, $U^O{}_2$ ... etc. of an output layers. These elements output $$z = f\left(\sum_j W_j y_j - \theta\right)$$

with respect to an input 302 $y_j$ ($j=1, 2, \ldots$) from the element of the intermediate layer in the same manner as above. The number of the elements of the output layer 303 is the same as the number of categories to be recognized. If weight coefficients and biases of all elements are ideally determined, only the output from the element which corresponds to the category to which the input belongs becomes 1, and outputs from the other elements become 0.

While FIG. 3 shows only a single intermediate layer, plural intermediate layers may be used.

A learning algorithm for determining the weight coefficient of each element and the value of the bias is described in detail in "Parallel Distributed Processing, Vol. 1" (Rumelhart et al., MIT Press, 1986).

Next, an explanation will be given of the meaning of signal processing in such a neural network. For simplification, a neural network having a single intermediate layer will be considered. If the outputs from the input layer and those from the output layer are collectively denoted by vectors x and y, respectively, the following relation holds for them:

$$y = f(W \cdot x - \theta) \qquad (1)$$

In the above equation, f represents a vector-valued function in which each element of the vector is put into a sigmoid function. $W \cdot x - \theta$ obviously represents an affine transformation. It can be construed that after an affine transformation is performed from the input layer to the intermediate layer, a transformation such that the value is limited to an interval [0, 1] is performed by using a sigmoid function.

FIG. 2 is a view which illustrates an example of the distribution of an input vector. For simplification, let the input vector x be a two-dimensional vector, and let object categories be three types $C_1$, $C_2$ and $C_3$. It is considered that when learning in accordance with a back propagation algorithm is completed, $\theta$ at that time converges on a vector close to an average of all learning data as shown by reference numeral 201 in FIG. 2.

The outputs from the intermediate layer and those from the output layer are represented by the following in the same manner as in equation (1):

$$z = f(W \cdot y - \theta) \qquad (2)$$

This should be construed in another way. That is, in equation (2), $W \cdot y - \theta$ can be regarded as a set of linear discriminant functions. Those obtained by putting each of the outputs into the sigmoid function become a final output Z.

An amount of correction $\Delta W_{ij}$ for the weight coefficient $W_{ij}$ is calculated by the following equation in the back propagation algorithm:

$$\Delta W_{ij} = -\eta \cdot \frac{\partial E}{\partial W_{ij}}$$

where $\eta$ is a positive constant, and E is an error of the entire network. That is, $$E = \frac{1}{2} \Sigma (t_j - y_j)^2$$

where $t_j$ is a supervisor signal, and $y_j$ is an output from the output layer.

$$\frac{\partial E}{\partial W_{ij}}$$

is calculated by using the output from each layer. A derivation thereof is known and is therefore omitted.

$W_{ij}$ is sequentially corrected by using the amount of this correction $\Delta W_{ij}$:

$$W_{ij}(n+1) = W_{ij}(n) + \Delta W_{ij}$$

Therefore, it is necessary that weight coefficients be corrected (this step is called learning) starting with a good initial value $W_{ij}(0)$. A correction similar to the above is performed for bias $\theta$ by regarding it as a weight coefficient for input data, the value of which is 1 at all times.

The back propagation algorithm depends upon the manner in which the initial values are given because the weight coefficient W and the bias $\theta$ are corrected sequentially. That is, if the initial values are not appropriately given, a solution may fall within a local minimum value, or diverge/oscillate. At the same time, the greater the number of parameters to be determined, such as W or $\theta$, the greater the degree of freedom, making it difficult to arrive at a correct solution. As explained above, since both W and $\theta$ are important, it is difficult to omit them.

SUMMARY OF THE INVENTION

The present invention provides a pattern recognition method for categorizing patterns into one of plural categories, wherein only a small number of parameters is required for categorization.

The present invention also provides a pattern recognition method for categorizing input data using a neural network, wherein a bias is not required for an intermediate layer of the neural network.

According to one aspect of the present invention, a method for processing input data for a neural network provided with learning data comprises the steps of producing an average value of the learning data, subtracting the average value from the input data to obtain difference data, and supplying the difference data to the neural network.

According to another aspect of the present invention, a method for categorizing input data into one of plural categories using a neural network provided with learning data comprises the steps of producing an average value of the learning data, subtracting the average value of the learning data, subtracting the average value from the input data to obtain difference data, supplying the difference data to the neural network, receiving a value corresponding to each category from the neural network, and categorizing the input data based on the received values.

According to another aspect of the present invention, a pattern recognition apparatus for categorizing a pattern into one of plural categories comprises feature extracting means for extracting feature data from the pattern, storing means for storing an average value, subtracting means for subtracting the average value in the storing means from the feature data extracted by the feature extracting means to form difference data, a neural network provided with learning data, said neural network receiving the difference data and outputting a value for each of the plural categories, wherein the average value stored in said storing means is the average value of the learning data, and categorizing means for categorizing the pattern on the basis of the outputs from the neural network.

According to another aspect of the present invention, a neural network provided with learning data for categorizing input data into one of plural categories comprises an input layer for inputting a value obtained by subtracting from the input data an average value of the learning data, at least one intermediate layer for processing data from the input layer, said intermediate layer having a bias set to zero and a sigmoid transfer function which is symmetric with respect to the origin and an output layer for receiving data from said at least one intermediate layer, and for outputting a value for each category.

According to yet another aspect of the present invention, a pattern recognition apparatus for categorizing a visually perceptible pattern into one of plural categories comprises converting means for converting the visually perceptible pattern into an electrical signal, preprocessing means for normalizing and binarizing the electrical signal, feature extracting means for extracting feature data from the normalized and binarized electrical signal, storing means for storing an average, subtracting means for subtracting the average stored in said storing means from the feature data extracted by said feature extracting means to form difference data, a neural network provided with learning data for receiving the difference data and for outputting a value for each of the plural categories, wherein the average value stored in said storing means is the average value of the learning data, and outputting means for outputting one of the plural categories on the basis of the outputs from said neural network.

Objectives and advantages in addition to those discussed above shall be apparent to those skilled in the art from the description of the preferred embodiment of the invention which follows. In the description, reference is made to the accompanying drawings, which form a part hereof, and which illustrate an example of the invention. Such example, however, is not exhaustive of the various embodiments of the invention, and therefore reference is made to the appended claims for determining the scope of the invention.

DESCRIPTION OF THE PREFERRED EMBODIMENT

A preferred embodiment of the present invention will be explained below with reference to the accompanying drawings.

Figure 1:
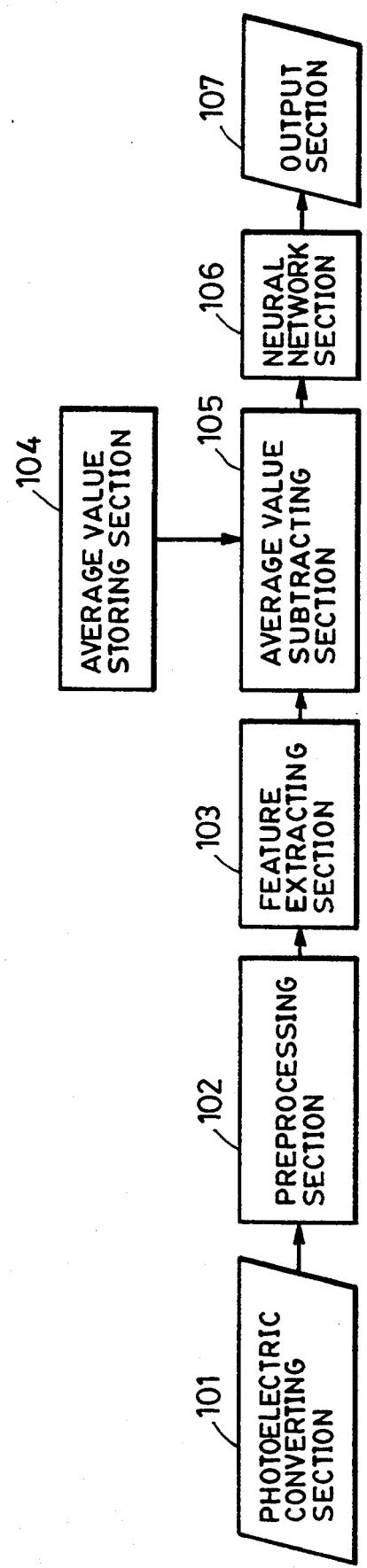
FIG. 1 is a block diagram which illustrates the construction of a character recognition apparatus of an embodiment of the present invention.
Figure 2:
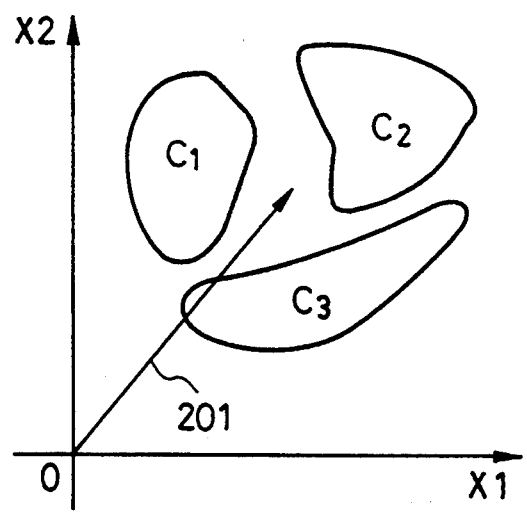
FIG. 2 is a schematic view which illustrates an example of the distribution of input data.

FIG. 1 is a block diagram which illustrates the construction of a character recognition apparatus which embodies the present invention. In FIG. 1, reference numeral 101 denotes a photoelectric converting section for inputting character images and converting them into electrical signals; reference numeral 102 denotes a preprocessing section for removing noise and performing binarization and normalization; reference numeral 103 denotes a feature extracting section for extracting characteristic features of a character in accordance with predefined algorithm; reference numeral 104 denotes an average-value storing section for storing an average value vector; reference numeral 105 denotes an average-value subtracting section for subtracting an average value vector from the feature data extracted by the feature extraction section; reference numeral 106 denotes a neural network section for determining to which category input characters belong; and reference numeral 107 denotes an output section for outputting a determined category. It is assumed that the preprocessing section 102 and the feature extracting section 103 are formed of means based on well-known technology and no particular preprocessing section or feature extraction section is preferred.

Next, an explanation will be given about a method for determining an average value vector of all learning data of the neural network. If categories to be determined are denoted as $C_1, C_2 \ldots C_M$ and a feature vector extracted from known learning data which belongs to a category $C_K (K=1, 2 \ldots, M)$ is denoted as $x^K_1$ ($i=1, 2 \ldots, N$), an average value vector $\bar{x}$ is calculated by the following equation:

$$\bar{x} = \frac{1}{M \times N} \sum_k \sum_i x_i^k$$

This average vector is calculated beforehand and stored in the average-value storing section 104.

The average-value subtracting section 105 provides difference data x by subtracting the average vector $\bar{x}$ from each of all input feature vectors x (i e., $x'=x-\bar{x}$) and sends the difference data to the neural network section 106.

Figure 3:
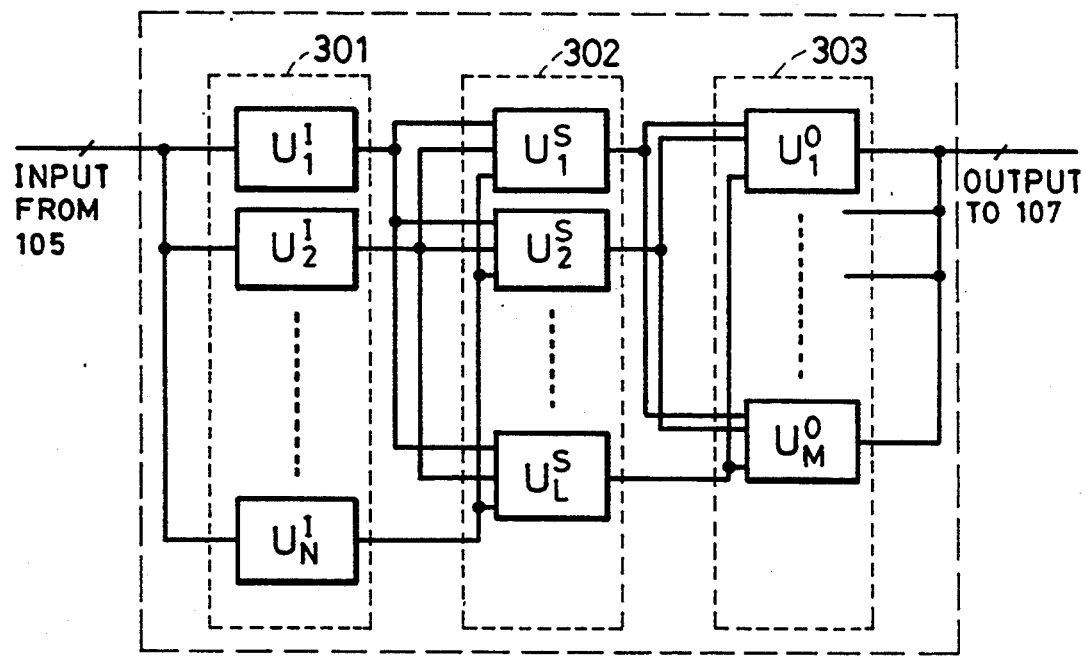
FIG. 3 is a view which illustrates the construction of a neural network.

The neural network section 106 is hierarchically structured, as shown in FIG. 3. A sigmoid function symmetric with respect to the origin, expressed by the following equation, is used for a threshold value function for each element:

$$f(s)=1/\{1+exp(-s)\}-\tfrac{1}{2}$$

The bias $\theta$ is not applied to the elements of the intermediate layer. Therefore, the relation between the input feature vector x and the output y from the intermediate layer becomes the following:

$$y=f(W\cdot x'),$$

where W is a matrix representing weight coefficients and f represents a vector-valued function of the sigmoid function. Since $x'$ is a value from which the average value vector of learning data of the neural network has already been subtracted, the bias $\theta$ need not be included in this transformation unlike the prior art. On the other hand, a transformation similar to that in the prior art is performed from the intermediate layer to the output layer:

$$z=f(W\cdot y-\theta)$$

The output section 107 outputs, as a candidate, a category corresponding to an element which outputs the greatest value of the components $z_k$ (K=1, 2 . . . , M) of the output z from the neural network section 106.

Although in the above-described embodiment, character images are used as input, the present invention can be applied when an input vector is speech input data, image input data, etc.

In the above-described embodiment, the intermediate layer is formed of a single layer, however, the intermediate layer may be formed of any number of layers. In the latter case, if an average vector of all learning data is subtracted from an input vector, as shown in the present invention, the bias $\theta$ need not be included in all the elements of the intermediate layer.

As explained above, even if the bias $\theta$ is not applied to the elements of the intermediate layer, recognition and classification can be performed by inputting a value in which an average value vector of all learning data of the neural network has been subtracted from an input vector. Since the number of parameters is decreased, when the bias $\theta$ is not input, the possibility that a solution falls within a local minimum value or diverges/oscillates during a learning process, becomes minimal.

Many different embodiments of the present invention may be constructed without departing from the spirit and scope of the present invention. It should be understood that the present invention is not limited to the specific embodiment described in this specification, and is only limited in the appended claims.

What is claimed is:

1. A method for training a neural network which includes at least one intermediate layer and for processing input data with the trained neural network, the method comprising the steps of:

producing an average value of plural learning data;

subtracting the average value from each of the plural learning data to obtain first difference data;

fixing a bias for the at least one intermediate layer to zero;

training the neural network, in which the bias for the at least one intermediate layer remains fixed to zero, with the first difference data;

subtracting the average value from the input data to obtain second difference data;

supplying the second difference data to the trained neural network, the neural network outputting a value as a function of the second difference data; and categorizing the input data on the basis of the value output from the neural network.

2. A method according to claim 1, further comprising the step of applying a sigmoid transfer function which is symmetric with respect to the origin to data to produce the output of the at least one intermediate layer.

3. A method according to claim 1, wherein said step of subtracting the average value from the input data and said step of supplying the second difference data are both performed each time input data is processed with the trained neural network.

4. A method for categorizing input data into one of plural categories using a neural network which includes at least one intermediate layer, said method comprising the steps of:

producing an average value of plural learning data;

subtracting the average value from each of the plural learning data to obtain first difference data;

fixing a bias for the at least one intermediate layer to zero;

training the neural network, in which the bias for the at least one intermediate layer remains fixed to zero, with the first difference data;

subtracting the average value from the input data to obtain second difference data;

supplying the second difference data to the trained neural network;

processing the second difference data with the trained neural network;

receiving a value corresponding to each category from the trained neural network; and determining one of the plural categories for the input data based on the received values.

5. A method according to claim 4, further comprising the step applying a sigmoid transfer function which is symmetric with respect to the origin to data to produce the output of the at least one intermediate layer.

6. A pattern recognition apparatus for categorizing an input pattern into one of plural categories, comprising:

feature extracting means for extracting feature data from the input pattern;

storing means for storing an average value of all the feature data extracted by said feature extracting means from a plurality of learning patterns;

subtracting means for subtracting the average value stored in said storing means from the feature data extracted by the feature extracting means to obtain difference data;

a neural network which includes at least one intermediate layer in which a bias is fixed to zero, said neural network being trained with data obtained by subtracting the average value from each of the feature data for the plural learning patterns, said neural network receiving the difference data from said subtracting means and outputting a value for each of the plural categories; and categorizing means for categorizing the input pattern on the basis of the outputs from said neural network.

7. An apparatus according to claim 6, wherein said neural network includes a sigmoid transfer function which is symmetric with respect to the origin.

8. A neural network for categorizing input data into one of plural categories, comprising:

an input layer for inputting a value obtained by subtracting from the input data an average value of plural learning data;

at least one intermediate layer for processing data from the input layer, said at least one intermediate layer having a bias fixed to zero and a sigmoid transfer function which is symmetric with respect to the origin; and an output layer for receiving data from said at least one intermediate layer and outputting a value according to each category, wherein said neural network is trained with data obtained by subtracting the average value of the plural learning data from the plural learning data.

9. A pattern recognition apparatus for categorizing a visually perceptible pattern into one of plural categories, comprising:

converting means for converting the visually perceptible pattern into an electrical signal;

preprocessing means for normalizing and binarizing the electrical signal;

feature extracting means for extracting feature data from the normalized and binarized electrical signal;

storing means for storing an average value of all the feature data extracted from normalized and binarized electrical signals for plural learning patterns;

subtracting means for subtracting the average value stored in said storing means from the feature data extracted by said feature extracting means to form difference data;

a neural network which includes at least one intermediate layer in which a bias is fixed to zero, said neural network being trained with the data obtained by subtracting the average value from each of the feature data for the plural learning patterns, said neural network receiving the difference data from said subtracting means and outputting a value for each of the plural categories; and outputting means for outputting one of the plural categories on the basis of the outputs from said neural network.

* * * * *